United States Patent
Uzawa

[11] Patent Number: 5,965,007
[45] Date of Patent: Oct. 12, 1999

[54] WATER AND METHOD FOR PROCESSING THEREOF

[75] Inventor: Masakazu Uzawa, Tokyo, Japan

[73] Assignee: Techno Science Co., Ltd., Tokyo, Japan

[21] Appl. No.: 08/878,850

[22] Filed: Jun. 20, 1997

[30] Foreign Application Priority Data

Jun. 21, 1996 [JP] Japan .................................. 8-161215

[51] Int. Cl.$^6$ ...................................................... C02F 1/46
[52] U.S. Cl. ............................................ 205/687; 205/745
[58] Field of Search ..................................... 205/745, 687

[56] References Cited

U.S. PATENT DOCUMENTS

| | | | |
|---|---|---|---|
| 5,368,705 | 11/1994 | Cassidy | 205/745 |
| 5,569,388 | 10/1996 | Kubo | 205/753 |
| 5,624,544 | 4/1997 | Deguchi et al | 205/742 |
| 5,728,288 | 3/1998 | Kubo | 205/763 |

*Primary Examiner*—Arun S. Phasge
*Attorney, Agent, or Firm*—Koda & Androlia

[57] ABSTRACT

Water having small clusters and exhibiting far infrared effect. By virtue of this, when radiation of far infrared is applied thereto, molecules of the water resonate because of their oscillation frequencies having been changed to those of the oscillations of the far infrared wavelengths. In other words, the water is brought to such a condition that far infrared is efficiently absorbed and readily converted into heat. As a result, specific heat capacity and thermal conductivity are improved. By virtue of this, when the water is ingested in a human body, it is easily absorbed and exhibits superior metabolic function in the human body. In addition, the water can be applied to any types of liquid.

2 Claims, 4 Drawing Sheets

WATER AND METHOD FOR PROCESSING THEREOF

FIELD OF THE INVENTION

The present invention relates to water and a processing method thereof and in particular to water having small clusters and exhibiting far infrared effects and a processing method for preparing the same.

BACKGROUND OF THE INVENTION

From the earliest times, water has been used not only for drinking but for many purposes. Among others, water accounts for a majority of a human body as a constituent. Therefore, water is essential to a human body and has an extremely important role. In terms of the importance of water, the same is true of other living bodies.

Water generally used includes tap water, natural mineral water, and processed water such as purified water. As drinking water, tap water and natural mineral water are usually used. Of these, natural mineral water may be taken as it is. With respect to tap water, however, water treating chemicals such as chloride of lime and, sometimes, impurities are contained therein. Accordingly, a water purifier is frequently used to eliminate these matters.

Basically, however, a water purifier is designed to remove odor of chloride of lime or rust of a water pipe by means of activated charcoal and/or to remove impurities or contaminants using a special filter. Therefore, such a water purifier is not designed to modify characteristics of water itself.

In recent years, it has been known that by taking so-called "cluster water" which has small clusters of water molecules, metabolic function of a human body is improved. In view of this, various methods have been developed to obtain smaller clusters of water molecules.

As examples of such cluster water, there may be mentioned high frequency reduced water, magnetically processed water, electron water and acid or alkaline electrolytic water. In processing to obtain any of these, water molecules are oscillated using electric or magnetic energy to thereby render clusters of water molecules smaller.

The conventional methods are, indeed, effective in rendering clusters smaller. To enhance metabolic function of a human body, however, it is important that specific heat capacity and thermal conductivity are increased when water is ingested in the human body. In any of the above-mentioned conventional cluster waters, there is a problem that this point is not taken into consideration at all.

SUMMARY OF THE INVENTION

The present invention has been made in view of the above problem. It is, therefore, an object of the present invention to provide small-cluster water having small water clusters and exhibiting far infrared effect, which is capable of efficiently absorbing far infrared radiation to convert it into heat and which is applicable to any types of liquid, and a processing method for preparing the same.

To attain the above object, the small-cluster water according to claim 1 consists essentially of small clusters and has far infrared effect which increases absorptivity and emissivity of far infrared energy.

According to the invention, the water has small clusters and has far infrared effect. Accordingly, when radiation of far infrared is applied thereto, molecules of the water resonate because of their oscillation frequencies having been changed to those of the oscillations of the far infrared wavelengths. In other words, the water is brought to such a condition that far infrared is efficiently absorbed and readily converted into heat. As a result, specific heat capacity and thermal conductivity are improved. By virtue of this, when the water is ingested in a human body, it is easily absorbed and exhibits superior metabolic function in the human body as compared to other ordinary water. In addition, the water can be applied to any types of liquid.

In the invention, the water consists essentially of clusters of 5 to 8 water molecules.

According to the invention, the water has clusters as small as about ⅓ of those of ordinary tap water and thereby exhibits improved effect on a human body.

The processing method for preparing small-cluster water comprises:

submerging ceramics having extremely high emissivity of far infrared in water in such an amount that the weight ratio thereof to the water (ceramics/water wt. ratio) is 10% or more, putting an electrode connected to a class one earth in the water, and allowing the water to stand in this condition for a predetermined period of time.

According to the invention, water is allowed to stand for a predetermined period of time with the ceramics having extremely high emissivity of far infrared submerged therein. The water thereby receives radiant energy having wavelengths of far infrared rays efficiently emitted from the ceramics. In other words, it receives oscillations of the specific wavelengths. By the oscillations of the far infrared rays, molecules of the water is caused to oscillate. Consequently, clusters of the water molecules are rendered smaller to about $(H_2O)5$–$(H_2O)8$, and the water molecules retain the oscillations of the wavelengths of the infrared rays. When radiation of far infrared is applied to the thus processed water, molecules of the water resonate because of their oscillation frequencies having been changed to those of the oscillations of the far infrared wavelengths. In other words, the water is brought to such a condition that far infrared is efficiently absorbed and readily converted into heat. Further, a class 1 earth is connected to the water via an electrode, and by virtue thereof, ions bearing positive electric charges in the water are electrically neutralized with negative ions under influence of the electric potential of the earth's crust, thereby leading to a lowered redox potential of the water in the reservoir on the whole. In consequence, ion balance of the water is improved.

Further, the invention provides a processing method wherein the ceramics have such a composition that $SiO_2$, $Al_2O_3$, $Fe_2O_3$, $MnO_2$, $ZnO$ and $CoO$ are within ranges of 50–70%, 10–30%, 10–20%, 0.1–0.3%, 0.01–0.05%, and 1–1.2%, respectively, and are prepared from fine powder of the mixture of these materials which has a particle diameter of 1 $\mu$m–5 $\mu$m.

According to the invention, the mixture of the materials has high emissivity of far infrared and the fine powder thereof has a 1 $\mu$m–5 $\mu$m particle diameter, thereby ensuring emissivity of far infrared at a level as high as about 0.9 or more. By virtue of this, an increased amount of radiation of far infrared is attained, and water is processed efficiently.

The invention provides the method wherein a weight ratio of the ceramics to the water is 20% and the period of time for allowing the water to stand is at least 12 hours.

According to the invention, the ceramics are submerged at a weight ratio of the ceramics to the water weight of 20%, thereby ensuring far infrared effect of the water.

As described above, the water of the present invention has small clusters and has far infrared effect. Accordingly, when radiation of far infrared is applied thereto, molecules of the water resonate because of their oscillation frequencies having been changed to those of the oscillations of the far infrared wavelengths. In other words, the water is brought to such a condition that far infrared is efficiently absorbed and readily converted into heat. As a result, specific heat capacity and thermal conductivity are improved. By virtue of this, when the water is ingested in a human body, it is easily absorbed and exhibits superior metabolic function in the human body. In addition, the water can be applied to any types of liquid.

DETAILED DESCRIPTION OF THE EMBODIMENTS

In the following, embodiments of the present invention will be described.

The water according to the present invention consists essentially of clusters of 5 to 8 water molecules, whereas ordinary tap water comprises clusters of the order of 15 to 20 water molecules. Further, this water is advantageously capable of exhibiting far infrared effect. In other words, if a specific oscillation is applied to water, the water accumulates the oscillation energy. Therefore, if water is exposed to energy of far infrared radiation, absorptivity and emissivity of the far infrared energy of the water are increased.

Figure 1:
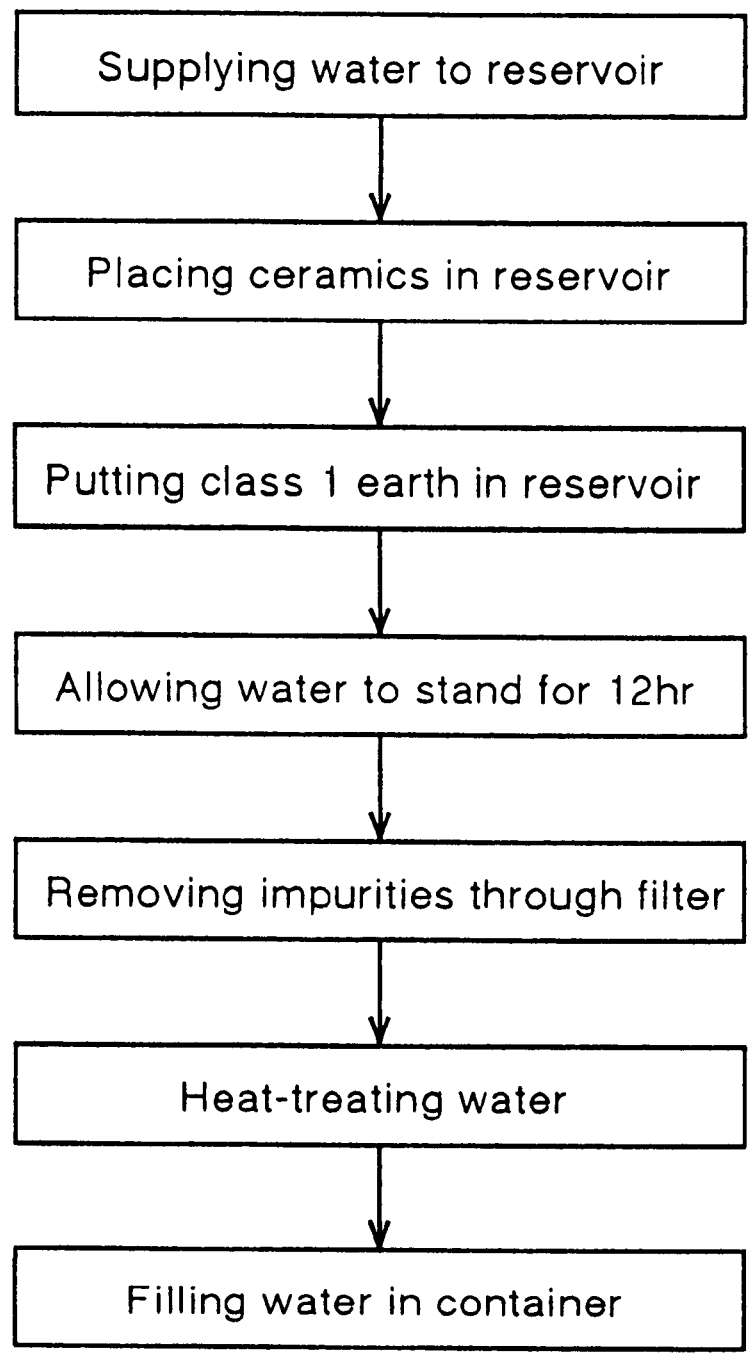
FIG. 1 is a block diagram illustrating one embodiment of the processing method for preparing the water according to the present invention.

The processing method for preparing the water according to the present invention will be described below with reference to the block diagram shown in FIG. 1.

First, a predetermined reservoir is prepared and water is placed into the reservoir. It is ideal that the water be natural mineral water. However, the water may be ordinary tap water, purified water or the like. In the water in the reservoir, ceramics are submerged in an amount of 10% or more, preferably about 20%, relative to the weight of the water. In this connection, a higher proportion of the ceramics results in a shorter processing time of the water. However, taking into consideration the amount of the water in the reservoir and efficiency of the subsequent processing, the proportion of about 20% yields the highest recovery of the water and the highest processing efficiency.

An electrode made of, for example, Ag, Pt, Au or the like is placed in the water in the reservoir, and a class 1 earth is connected thereto. The system is allowed to stand for at least 12 hours.

The ceramics are those having extremely high rate and amount of radiation of far infrared. Specifically, the ceramics are made of $SiO_2$ (silica), $Al_2O_3$ (alumina), $Fe_2O_3$ (iron oxide), $MnO_2$ (manganese dioxide), $ZnO$ (zinc oxide) and $CoO$ (cobalt monoxide) and prepared by mixing these starting material, pulverizing the mixture into fine powder, and then burning the fine powder to form porous spheres. The ceramic is not limited to a spherical shape and may be formed into a cubic, rectangular parallelepipedic, polyhedral or stick-like shape, or any other desired shape.

The ceramics have, for example, such a composition that $SiO_2$, $Al_2O_3$, $Fe_2O_3$, $MnO_2$, $ZnO$ and $CoO$ are within ranges of 50–70%, 10–30%, 10–20%, 0.1–0.3%, 0.01–0.05%, and 1–1.2%, respectively, and these proportions of the components are almost the same as those of earth's crust. The burning is carried out at a temperature of 1000° C.–1200° C. and the fine powder of the mixture has a particle diameter of 1 $\mu$m–5 $\mu$m. If the particle diameter is equal to or smaller than 1 $\mu$m, the burning proceeds to excess to cause sintering, thereby yielding a non-porous product. The formation of the non-porous product leads to a smaller surface area, which in turn leads to a radiation rate of far infrared as low as about 0.7 to about 0.8. On the other hand, if the particle diameter is equal to or greater than 5 $\mu$m, the porous product has a smaller surface area, also resulting in a radiation rate of far infrared as low as about 0.7 to about 0.8. The 1 $\mu$m–5 $\mu$m particle diameter of the fine powder of the mixed materials ensures emissivity of far infrared at a level as high as about 0.9 or more. Further, since the fine powder of the materials is subjected to the burning, an extremely fine porous product is obtained, thereby enabling a remarkably increased surface area to be realized. By virtue of this, an increased amount of radiation of far infrared is attained.

Most preferably, the ceramic has such a composition that $SiO_2$, $Al_2O_3$, $Fe_2O_3$, $MnO_2$, $ZnO$ and $CoO$ are mixed in proportions of 63%, 18.7%, 15%, 0.2%, 0.03%, and 1.07%, respectively, and the mixture is pulverized into fine powder having a particle diameter of 3.8 $\mu$m, and the fine powder is burned at a temperature of 1080° C. On measurement of the thus prepared ceramics by means of a Fourier transform spectrophotometer, the ceramics are found to exhibit an extremely high radiation rate of 0.96 on average with respect to far infrared having wavelengths of 4–1000 $\mu$m.

After the system is allowed to stand for at least 12 hours as described above, the water is subjected to filtration to remove impurities and then heat-treated and filled in a container such as a bottle or a can.

Now, explanation will be given on the function of the embodiment according to the present invention.

In general, water has property of remembering external energy applied thereto. In other words, water molecules have natural oscillation; however, if oscillation having a specific wavelength is externally applied to water as external energy, water molecules retain the applied oscillation still after termination of the application of the oscillation.

Accordingly, when water is allowed to stand for a predetermined period of time with ceramics submerged therein which exhibit extremely high far infrared emissivity as the embodiment according to the present invention, the water receives radiant energy having wavelengths of far infrared rays efficiently emitted from the ceramics. In other words, it receives oscillations of the specific wavelengths. By the oscillations of the far infrared rays, molecules of the water is caused to oscillate. Consequently, clusters of the water molecules are rendered smaller to about $(H_2O)5$–$(H_2O)8$, and the water molecules retain the oscillations of the wavelengths of the infrared rays.

When radiation of far infrared is applied to water so processed as to have far infrared effect as described above, molecules of the water resonate because of their oscillation frequencies having been changed to those of the oscillations of the far infrared wavelengths. In other words, the water is brought to such a condition that far infrared is efficiently absorbed and readily converted into heat.

It is well-known that water accounts for 70% of weight of a human body, and tap water has normally the greatest specific heat capacity and the highest thermal conductivity among all kinds of liquid. Based on this, water in a human body is believed to be effective in minimizing temperature change to contribute to thermostasis. Further, there is a fact that radiation rate of far infrared of a human skin is close to 1 (100%). Accordingly, it is considered that water exhibiting far infrared effect and having small clusters as the water according to the present invention is improved in specific heat capacity and thermal conductivity. By virtue of this, when such water is ingested in a human body, it is easily absorbed and exhibits superior metabolic function in the human body as compared to other ordinary water.

Next, explanation will be given on results of measurement of heat increase rate where the water according to the present invention and tap water are heated.

Into a beaker wound with insulation material, 500 cc of water was charged. The beaker was placed on an electric heater of 500 W output and heated for 2 minutes. Then, a temperature of the water is measured at a position 3 mm below the surface of the water in the beaker by means of a semi-conductor thermometer having measuring capability of 0.1° C. order. The measurement was carried out 10 times on each of the water according to the present invention and the tap water. The water of the present invention and the tap water were both allowed to stand at room temperature and had a temperature of 27° C.±0.3° C. at the initiation of the measurement. The results of the measurement are shown in Table 1.

transferred from the heater to the water of the present invention as large as 17.4% in excess of that to the tap water. This is considered to be attributable mainly to the small clusters of the water according to the present invention which provide larger surface areas of water molecules to permit the water molecules to receive the heat from the heater in a lager quantity.

Then, explanation will be given on results of measurement of heat increase rate where the water according to the present invention and tap water are irradiated with infrared radiation.

Figure 2:
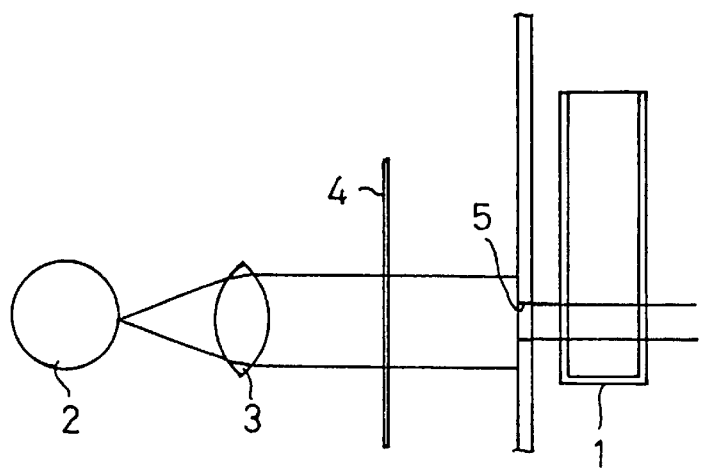
FIG. 2 is a schematic view showing a test device used in experiment on the water according to the present invention.

FIG. 2 schematically shows a test device used in this experiment. The test device comprises an optical test cell 1 for a spectrophotometer in the form of a square pipe with a 10 mm-sided square inner bottom surface, and a tungsten halogen lamp 2 as a light source disposed on one side relative to the optical test cell 1 at a predetermined distance therefrom. A lens 3 is disposed between the optical test cell 1 and the tungsten halogen lamp 2 at a distance of 100 mm from the optical test cell 1 for collimating light emitted from the tungsten halogen lamp 2. An optical filter 4 is disposed between the optical test cell 1 and the lens 3 for rejecting light beams having wavelengths less than 1100 nm of the light emitted from the tungsten halogen lamp 2. By the action of the optical filter 4, the optical test cell 1 is irradiated with near infrared and far infrared. A slit member 5 is placed near the optical test cell 1 to irradiate only a lower portion of the optical test cell 1 with the light emitted from the light source via the lens 3.

Using the device as described above, 4 cc of water was placed into the optical test cell 1 and allowed to stand for 21 minutes with the tungsten halogen lamp 2 on. Then, a temperature of the water was measured at a position 4 mm below the surface of the water in the optical test cell 1 by means of a semi-conductor thermometer having measuring capability of 0.1° C. order. The measurement was carried out

TABLE 1

Results of Measurement of Temperature Rise of Water Heated by Heater (° C.)

| Meas. No. | 1 | 2 | 3 | 4 | 5 | 6 | 7 | 8 | 9 | 10 |
|---|---|---|---|---|---|---|---|---|---|---|
| Tap W. | 62.3 | 61.8 | 63.0 | 62.2 | 61.7 | 62.2 | 62.8 | 62.0 | 62.4 | 61.9 |
| W. of Inv. | 69.6 | 70.0 | 68.9 | 69.7 | 69.9 | 70.1 | 69.3 | 69.8 | 70.0 | 69.1 |

According to the results of the test, the tap water exhibited a temperature rise to 62.23° C. on average, whereas the water according to the present invention exhibited a temperature rise to 69.64° C. on average. The difference therebetween of about 7.41° C. in temperature rise was observed. If the difference in temperature rise is considered in terms of quantity of heat, it is understood that the heat was 10 times on each of the water according to the present invention and the tap water. During the measurement, each water was not stirred. The water of the present invention and the tap water were both allowed to stand at room temperature prior to the measurement and had a temperature of 25.5° C.±0.3° C. at the initiation of the measurement. The results of the measurement are shown in the following Table 2.

TABLE 2

Results of Measurement of Temperature Rise of Water Irradiated with Infrared Radiation (° C.)

| Meas. No. | 1 | 2 | 3 | 4 | 5 | 6 | 7 | 8 | 9 | 10 |
|---|---|---|---|---|---|---|---|---|---|---|
| Tap W. | 28.9 | 29.1 | 28.7 | 28.9 | 29.2 | 28.5 | 28.8 | 29.0 | 28.7 | 28.9 |
| W. of Inv. | 29.6 | 29.8 | 29.4 | 29.9 | 29.7 | 30.0 | 29.6 | 29.8 | 29.5 | 30.1 |

According to the results of the test, the tap water exhibited a temperature rose to 28.87° C. on average, whereas the water according to the present invention exhibited a temperature rise to 29.74° C. on average. The difference therebetween of about 0.87° C. in temperature rise was observed. This is considered to be attributable to high absorptivity of far infrared of the water according to the present invention, which enables the water of the invention to absorb the light from the tungsten halogen lamp 2 as heat rays, whereby the water of the invention exhibited the temperature rise in excess of that of the tap water.

It is understood from the results of the test that the water of the present invention has smaller clusters and exhibits far infrared effect.

Further, as described above, by connecting a class 1 earth to the water via an electrode, ions bearing positive electric charges in the water are electrically neutralized with negative ions under influence of the electric potential of the earth's crust, thereby leading to a lowered redox potential of the water in the reservoir on the whole. In consequence, ion balance of the water is improved. When such water having its reduction potential lowered is ingested in a body, the reduction potential acts on unstable materials in the body such as active oxygen, thereby exhibiting function of stabilizing the unstable materials in vivo.

It is to be noted that the above-mentioned period of time for submerging the ceramics in water is for a case where the weight ratio of the ceramics to the water is 20%. If the ceramics have a larger proportion, the submerging time may be shorter. On the other hand, if the ceramics have a smaller proportion, the submerging time should be longer.

Figure 3:
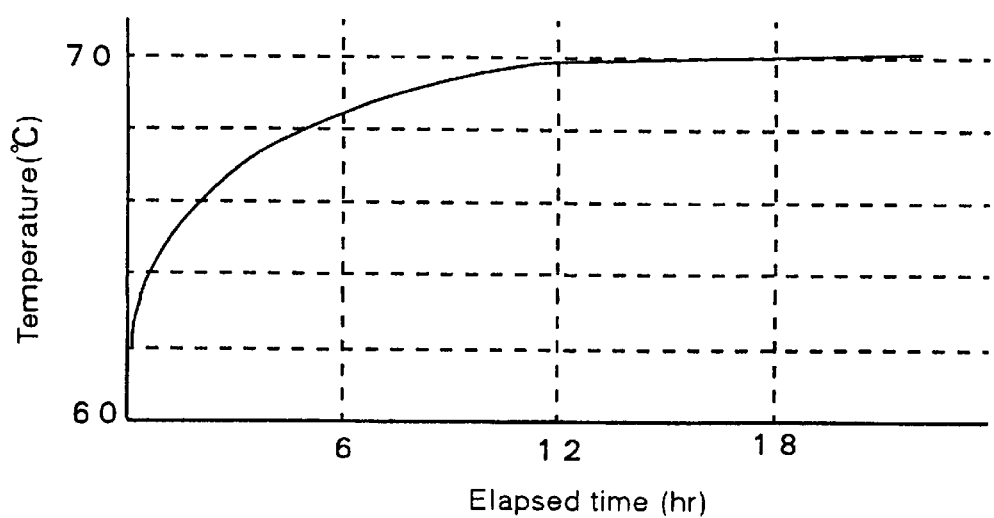
FIG. 3 is a graph showing relationship between immersion time of ceramics and temperature rise of water.

In this connection, the submerging time of the ceramics in the water of 12 hours for the case was determined on the following ground. When the same procedure as in the above-described test on temperature rise of water heated by a heater was repeated every hour after submergence of ceramics in water at a ceramics/water weight ratio of 20%, the results were as shown in FIG. 3. In other words, whereas temperature rise was observed with passage of time until the lapse of 12 hours, no substantial change was observed in temperature rise after the lapse of 12 hours.

Then, explanation will be given on effect when the water of the present invention is ingested in a human body.

First, description will be made on results of test on influence of the water of the present invention on lipoperoxide.

Figure 4:
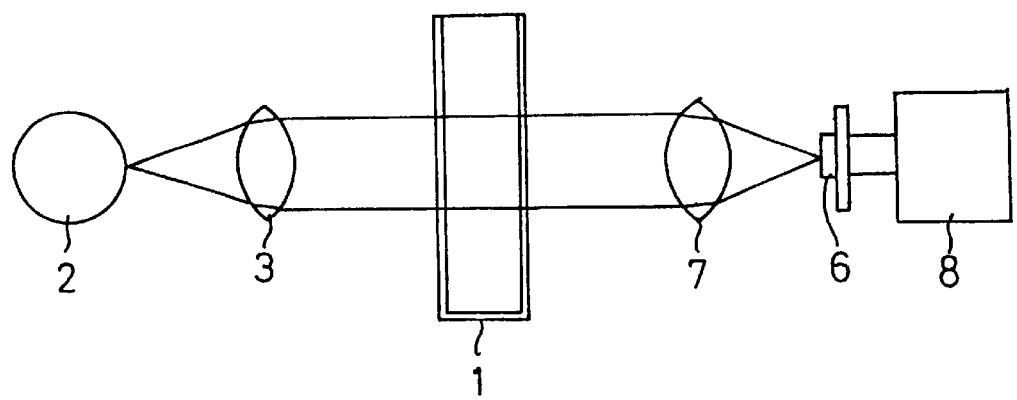
FIG. 4 is a schematic view showing another test device used in experiment on the water according to the present invention.

FIG. 4 schematically shows a test device used in the test. As in the test on temperature rise of water irradiated with infrared radiation, the test device comprises an optical test cell 1 for a spectrophotometer, and a tungsten halogen lamp 2 as a light source disposed on one side relative to the optical test cell 1 at a predetermined distance. A lens 3 is disposed between the optical test cell 1 and the tungsten halogen lamp 2 to collimate light emitted from the tungsten halogen lamp 2, and a photodiode 6 as a light receiving element is disposed on the opposite side relative to the optical test cell 1. A lens 7 is disposed between the optical test cell 1 and the photodiode 6 for condensing light beams transmitted by the optical test cell 1. A measuring device 8 is connected to the photodiode 6 to determine intensity of the light beams transmitted by the optical test cell 1 based on the measured electric voltage of the photodiode 6.

Using the device as described above, an animal lipid such as lard, for example, in molten state by heating at about 60° C. was placed into in the optical test cell 1 in an amount of 1 cc, and then 1 cc of hydrogen peroxide was added thereto.

Then, the mixture was stirred. The lard was thereby converted into a lipoperoxide, and as a result, a water layer as a lower layer and a lipoperoxide emulsion layer as an upper layer were formed in the optical test cell 1.

Figure 5:
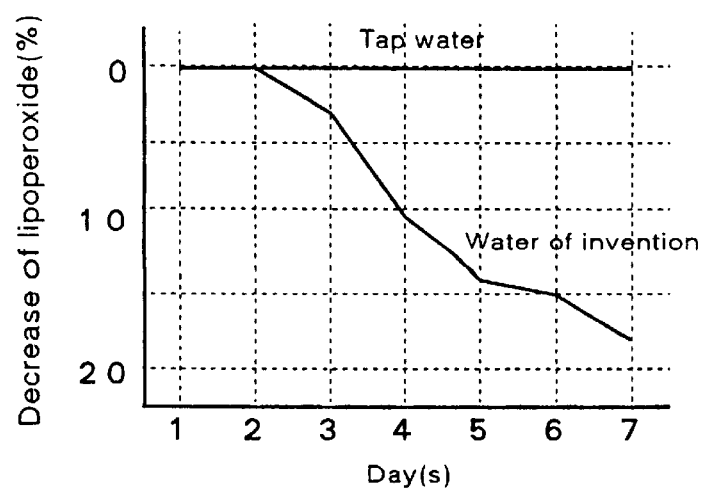
FIG. 5 is a graph showing decrease of lipoperoxide by the water of the present invention.

Thereafter, the water of the present invention was dropwise added to the contents of the optical test cell 1 in an amount of 1/30 cc every hour while soaking the optical test cell 1 in hot water at about 36° C. to maintain substantially the same temperature as human body temperature, and light transmittance of the lipoperoxide layer was measured. Subsequently to each dropwise addition of the water of the present invention and measurement of light transmittance, the contents of the optical test cell 1 were stirred. In this connection, when the lipoperoxide is decomposed, color change occurs from milky color of the lipoperoxide to transparency. In other words, the decomposition of lipoperoxide provides a broadened light transmitting area, resulting in an increased light transmittance. Regarding increase of the light transmittance as decrease of the lipoperoxide, decrease of the lipoperoxide was calculated from the light transmittance. The same test was also carried out with respect to ordinary tap water. The results are shown in FIG. 3, and a graphical representation of the test results is shown in FIG. 5.

TABLE 3

| | Decrease of Lipoperoxide (%) | | | | | | |
|---|---|---|---|---|---|---|---|
| Elapsed Time | 1 hr. | 2 hr. | 3 hr. | 4 hr. | 5 hr. | 6 hr. | 7 hr. |
| Tap W. | 100.0 | 100.0 | 100.0 | 100.0 | 100.0 | 100.0 | 100.0 |
| W. of Inv. | 100.0 | 100.0 | 97.2 | 90.1 | 86.3 | 84.9 | 82.1 |
| Decrease | 0 | 0 | 2.8 | 9.9 | 13.7 | 15.1 | 17.9 |

According to the results of the test, no difference was observed between the cases until passage of two hours. However, in the case where the water of the present invention was dropwise added to the lipoperoxide, decrease of the lipoperoxide was observed in an amount of 2.8%, 9.9% and 17.9% as of passage of 3, 4 and 7 hours, respectively. On the other hand, no change was observed over the period of the test in the case where the tap water was dropwise added to the lipoperoxide.

This is considered to be attributable to the small clusters of the water of the present invention, which enable the water to permeate even into bottleneck portions of the lipoperoxide, and attributable also to the far infrared effect of the water, which improves heat transfer to contribute to softening of the lipoperoxide by heat, and attributable further to reduction of the softened lipoperoxide with the lowered redox potential to thereby facilitate dissolution of the lipoperoxide.

In the following, description will be made on results of test carried out with respect to influence of the water according to the present invention on active oxygen.

Figure 6:
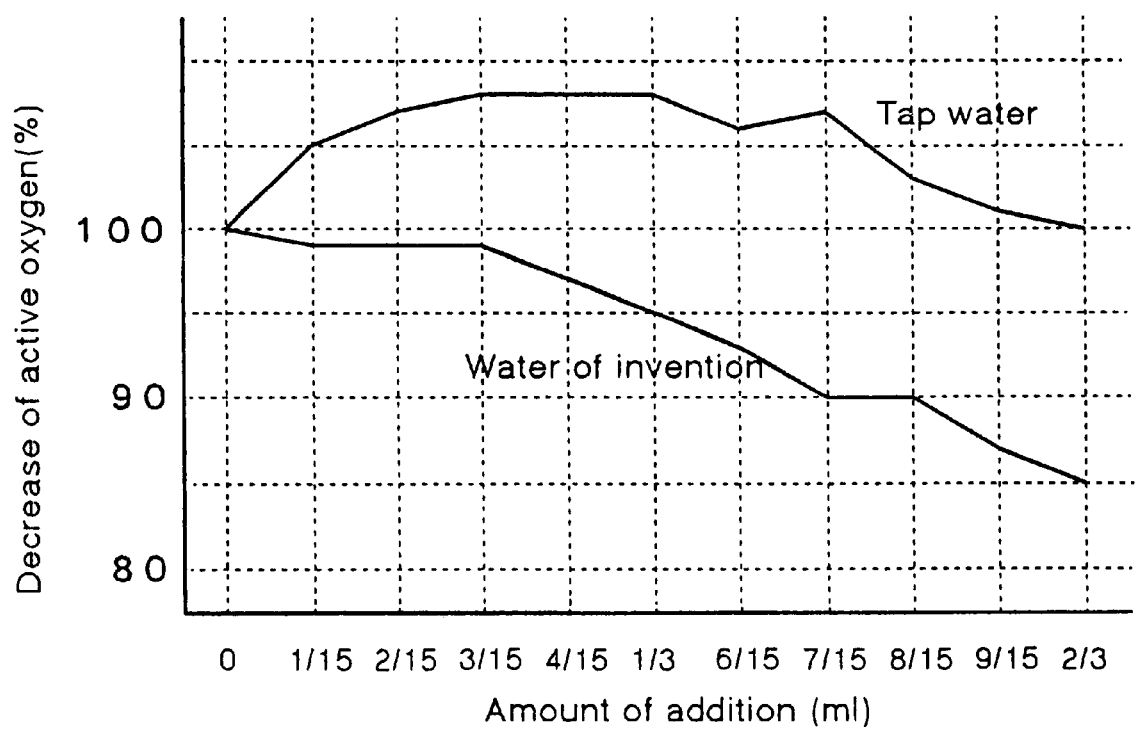
FIG. 6 is a graph showing decrease of active oxygen by the water of the present invention.

In this experiment, the same test device as shown in FIG. 4 was used. Into an optical test cell 1, 2 ml of the water of the present invention, 3/30 ml of potassium iodide, 3/30 ml of starch, and 1/30 ml of hydrogen peroxide were placed. The resulting solution was subjected to iodometric titration utilizing iodo-starch reaction, and light transmittance was measured every dropwise addition of 1/30 ml of a standard solution. In this connection, it is generally known that purple coloration is observed in iodo-starch reaction. However, when active oxygen decreases, change in purple reaction color occurs, which leads to change in light transmittance. Hence decrease of the active oxygen was calculated from the light transmittance. The results of the calculation are shown in FIG. 4, and a graphical representation of the test results is shown in FIG. 6.

TABLE 4

| | Decrease of Active Oxygen (%) | | | | | | | | | | |
|---|---|---|---|---|---|---|---|---|---|---|---|
| Amt. of Add. (ml) | 0 | 1/15 | 2/15 | 3/15 | 4/15 | 1/3 | 6/15 | 7/15 | 8/15 | 9/15 | 2/3 |
| Tap W. | 100 | 100 | 100 | 100 | 100 | 100 | 100 | 100 | 100 | 100 | 100 |
| W. of Inv. | 100 | 99 | 99 | 99 | 97 | 95 | 93 | 90 | 90 | 87 | 85 |

According to the results of the experiment, active oxygen was found to decrease every dropwise addition of the standard solution in the water of the present invention. Finally, the decrease was found to be as large as 15%. In contrast, over the period of the experiment, no change was observed in the tap water.

This is considered to be attributable to the lowered redox potential of the water of the present invention, which acts on active oxygen to stabilize the active oxygen.

In the following, explanation will be given on results of experiment carried out with respect to influence of the water of the present invention upon the maximum oxygen intake of a human body.

The water of the present invention was ingested by 12 subjects (persons) for two months to measure the maximum oxygen intake of each of the subjects. The results are shown in the following Table 5.

TABLE 5

Results of Measurement of Maximum Oxygen Intake (ml/kg)

| Subj. | Init. | 3 Wk. | 5 Wk. | 7 Wk. | 2 Mth. | Av. Intake*(1) | Intake**(d.) |
|---|---|---|---|---|---|---|---|
| A | 44.8 | 53.1 | 53.8 | 54.6 | 53.9 | 1.20 | 60 |
| B | 46.2 | 48.6 | 47.6 | 42.4 | 45.2 | 1.58 | 60 |
| C | 49.5 | 47.5 | | | 53.0 | 1.39 | 32 |
| D | 50.0 | | 56.7 | | 56.2 | 1.54 | 49 |
| E | 49.6 | | | | 57.2 | 1.43 | 34 |
| F | 41.2 | 42.1 | | | 52.9 | 0.62 | 57 |
| G | 42.2 | 46.9 | 46.2 | | 46.0 | 1.06 | 48 |
| H | 44.5 | | | | 43.3 | 2.40 | 40 |
| I | 41.6 | 42.0 | | | 54.9 | 1.13 | 60 |
| J | 41.2 | 43.0 | | | 51.1 | 1.26 | 60 |
| K | 45.9 | | 49.9 | 53.5 | 51.4 | 1.20 | 60 |
| L | 53.9 | 57.2 | | | 58.5 | 1.40 | 60 |

*Av. Intake: Average Intake of Water Per Day
**Intake: Number of Days in which the Water was Ingested According to the results of the experiment, 13.26% of increase of the maximum oxygen intake was observed on average. The reason for the increase of the maximum oxygen intake is considered to be as follows. The water of the present invention has small clusters. Accordingly, when the water circulates in a human body as a constituent of blood, the small clusters enable the blood to pass throughout capillaries of lungs of the human body. Further, metabolic function is enhanced by the far infrared effect of the water of the present invention.

As described above, the water of the present invention has small clusters and exhibits far infrared effect, and yet the water has its redox potential lowered. Accordingly, for example, when the water of the present invention is ingested in a human body, it is absorbed quickly and capable of enhancing metabolic function and thus well-beneficial to a human body.

In the above embodiments, the cases where the water was used as potable water have been described. However, the water of the present invention can be utilized not only as potable water but also in any applications where ordinary water is used, for example, soft drinks such as fruit-flavored drinks, coffee, black tea and green tea; alcohol-, medicine-, and nutrient-containing beverages; and fluid seasonings such as soy sauce and vinegar. Further, the water of the present invention can be applied to all kinds of liquid using water, for example, cosmetics such as cosmetic lotion.

Further, when the water of the present invention is applied to cooking, it is possible to boil the water in a shortened period of time, as can be understood from the above experiment. For example, when foods such as vegetables and meat are cooked in the water of the present invention, the heat propagates evenly and the foods are cooked well in a shortened period of time by virtue of the small clusters which provide larger contact area of the water and the rapid heat transfer of the water molecules.

Moreover, when the water of the invention was applied to mixing of a ready-mixed concrete, the small clusters of the water enable increased density of concrete to be realized, thus leading to increased strength of the concrete.

It is to be understood that the present invention is by no means restricted to the above-described embodiments, and various changes and modifications may be made according to need.

What is claimed is:

1. A processing method for preparing water, the method comprising:

submerging ceramics having extremely high emissivity of far infrared in water in such an amount that the weight ratio thereof to the water (ceramics/water wt. ratio) is 10% or more, putting an electrode connected to a class one earth in the water, and allowing the water to stand in this condition for a predetermined period of time and wherein the ceramics have such a composition that $SiO_2$, $Al_2O_3$, $Fe_2O_3$, $MnO_2$, ZnO and CoO are within ranges of 50–70%, 10–30%, 10–20%, 0.1–0.3%, 0.01–0.05%, and 1–1.2%, respectively, and are prepared from fine powder of the mixture of these materials which has a particle diameter of 1 $\mu$m–5 $\mu$m.

2. A processing method according to claim 1, wherein the weight ratio of the ceramics to the water is 20% and the period of time for allowing the water to stand is at least 12 hours.

\* \* \* \* \*